United States Patent [19]

Perrault et al.

[11] 4,181,279
[45] Jan. 1, 1980

[54] CABLE SUPPORT STRUCTURE

[76] Inventors: Frederick Perrault, 2644 W. 225th St., Torrance, Calif. 90505; Raymond E. Perrault, 2404 Colt Rd., Rancho Palos Verdes, Calif. 90274

[21] Appl. No.: 832,406

[22] Filed: Sep. 12, 1977

[51] Int. Cl.² ............................................. F16L 3/00
[52] U.S. Cl. ...................................... 248/70; 248/73; 248/220.3; 248/222.2; 248/224.4; 248/301
[58] Field of Search ............ 248/73, 70, 68 R, 222.2, 248/222.3, 220.2, 220.3, 224.4, 225.2, 301

[56] References Cited

U.S. PATENT DOCUMENTS

| | | | |
|---|---|---|---|
| 254,333 | 2/1882 | Kane | 248/68 R |
| 459,844 | 9/1891 | Thomas. | |
| 799,092 | 9/1905 | Rosenfeld. | |
| 1,087,302 | 2/1914 | Kobert | 248/68 R X |
| 1,657,939 | 1/1928 | Rockwell. | |
| 1,775,391 | 9/1930 | Fassinger. | |
| 1,853,018 | 4/1932 | Knape. | |
| 2,322,576 | 6/1943 | Huebshman et al. | 248/222.2 X |
| 2,553,960 | 5/1951 | De Swart | 248/222.2 X |
| 2,594,211 | 4/1952 | Poupitch | 248/68 R |
| 2,997,269 | 8/1961 | Urbain et al.. | |
| 3,094,892 | 6/1963 | Topf | 248/220.3 X |
| 3,235,218 | 2/1966 | Graham | 248/220.3 |
| 3,367,286 | 2/1968 | Jantzen | 248/222.2 X |
| 3,771,665 | 11/1973 | Potter. | |
| 3,888,441 | 6/1975 | Rebentisch. | |
| 3,923,277 | 12/1975 | Perrault et al. | 248/70 XR |
| 4,039,131 | 8/1977 | Perrault et al.. | |

FOREIGN PATENT DOCUMENTS

| | | | |
|---|---|---|---|
| 1960111 | 6/1971 | Fed. Rep. of Germany. | |
| 1096254 | 6/1955 | France | 248/220.3 |
| 6413 | of 1893 | United Kingdom | 248/222.2 |
| 566891 | 6/1943 | United Kingdom. | |
| 702976 | 1/1954 | United Kingdom | 248/73 |

OTHER PUBLICATIONS

Exhibit A—Machine Copy of Peg Board Clip (not dated).
"Underground Devices, Inc.", catalog sheet (not dated).
"Southern California Edison Company—Underground Construction Methods", catalog sheet RS 2-100, 4/8/75.
"Southern California Edison Company", sheet UG-9110, 1/1/75.

Primary Examiner—Rodney H. Bonck
Attorney, Agent, or Firm—Gausewitz, Carr & Rothenberg

[57] ABSTRACT

A flanged, J-shaped bracket formed of sheet metal is provided in combination with a T-slotted downcomer (vertical channel), and creates an extremely strong support for heavy electrical cable. There is provided at the upper end of the bracket a connector element shaped generally as a hollow elbow having two portions. One such portion, the lower, is a very strong protuberance formed by making a deep recess in the web of the bracket. The underside of the protuberance seats on the bottom edge defining the T-slot, and bears large shear loads. The other such connector portion, the upper, is a tab inserted behind the upper edge defining the T-slot, and bears compression loads resulting from torque. The upper region of the protuberance fits relatively closely below the above-mentioned upper edge, thus causing the connector element to be immune to upward vibratory and other forces. The bottom surface of the protuberance is a rounded cam which greatly facilitates mounting of the bracket to the downcomer. In the web of the hook portion of the J is a bead which not only adds strength but aids in positioning the bracket in high-strength relationship. A part of this bead engages the downcomer and bears large compressive loads caused by torque. The hook portion of the bracket is well below the connector element, and this also is important to the achievement of proper torque and strength relationships.

20 Claims, 9 Drawing Figures

CABLE SUPPORT STRUCTURE

BACKGROUND OF THE INVENTION

1. Field of the Invention

This invention relates to the field of supporting devices for cables and the like.

2. Description of Prior Art

There now exist, in underground vaults and passages for electrical cables, large numbers of vertical supporting elements called "downcomers." Each such downcomer is a channel which is bolted at its ends to a wall or bulkhead, the relationship being such that the edges of the channel flanges engage the wall while the web is spaced away from the wall.

Provided in vertically spaced relationship in the web are T-shaped slots or openings. The reason that the openings are T-shaped is that they are designed to receive mounting portions of conventional support brackets for the cable. These mounting portions are generally T-shaped as viewed from above, being adapted to be inserted through the cross-bar portions of the T-slots and then dropped into the stem portions thereof, so that the ears (T-ends) of the mounting portions are disposed behind the web adjacent the stems of the T-slots.

The described brackets are often characterized by deficiencies relative to such factors as cost, strength, tendency toward sudden calamitous failure instead of gradual bending, etc. They often require two regions of attachment to the downcomer, at two vertically-spaced T-slots, which creates problems relative to mounting and relative to distribution of load. There are additional inadequacies of present brackets, and two of these will now be discussed briefly.

The cables are frequently strung through passages beneath roads for trucks, etc., so that there is considerable vibration in the passages and vaults. In some locations the vibration is so substantial that the cables and their associate brackets actually vibrate out of the T-slots, with consequent loss of support. It is, therefore, highly advantageous that, without using separate parts or inserts, or any special means for connecting the brackets to the downcomers, it be substantially impossible for a bracket ever to be vibrated or otherwise dislodged out of position. It is especially desirable that this be accomplished while making connection at only a single T-slot instead of two. Conversely, however, it is desirable that the bracket be readily removable and shiftable to another position when desired.

Relative to an additional disadvantage of conventional constructions of the type indicated, the heavy loads created by the cables generate forces which tend to pull the downcomers substantial distances away from the wall. In some cases, for example, the downcomers may bend about two inches from the wall, which is a very adverse condition. It is, therefore, important that brackets be used which generate forces such as to minimize the tendency toward bending the downcomers.

SUMMARY OF THE INVENTION

Applicants have discovered that by going entirely contrary to the conventional manner of associating a bracket with a T-slotted downcomer there is created a bracket which is surprisingly strong, inexpensive, vibration resistant, easy to insert and remove, etc., and which minimizes the tendency of the downcomer to pull away from the wall. The present bracket is usable in combination with existing, as well as new, T-slotted downcomers. Furthermore, it is usable with supports having certain other types of openings as distinguished from T-slots.

The present bracket has a connector element which does not fit behind the downcomer portions adjacent the stem regions of the T-slots, but instead extends upwardly above the cross-bar portions thereof. Furthermore, and very importantly, the connector element has a strong lower region which seats on the downcomer at the bottom of a T-slot stem. Although the bracket is preferably formed of sheet metal, this lower region has been found to be so strong that connection is only required at a single T-slot.

In addition, the configuration of the connector element is caused to be such that a portion thereof is immediately below the downcomer region adjacent the upper side of the cross bar of the T, so that the bracket cannot vibrate or move out of position unless such removal is intentional.

A cam region of the connector element provides a substantially automatic gravity-actuated mounting, once mounting is initiated, and does so in such manner that there is no binding with the wall despite the fact that the flanges of the downcomer are conventionally quite narrow.

Stated more definitely, the connector element is generally elbow-shaped, having two portions, one of which is a recess-formed protuberance, and the other of which is a tab. The protuberance is an extremely strong shear-resistant recessed region of the web of the bracket, and seats at the lower end of the T-slot stem as stated above. The tab extends upwardly behind the downcomer above the T-slot.

The angle of the lower surface of the protuberance, at the lower end of the T-slot stem, is critically important to the achievement of great strength. Such angle is less than 45 degrees relative to the horizontal, and is preferably about 30 degrees (or even less) relative to the horizontal.

The cable is supported on a hook region of the bracket, at a location substantially below the T-slot, and this hook region is adapted to seat against the downcomer. Thus, there is a high compressive load at the hook region and directed inwardly against the downcomer, and a much lower compressive load at the tab and directed outwardly against the downcomer. Particularly because the lower compressive region, between the J-hook and the downcomer, is well below the T-slot and its associated connector element, the tendency of the downcomer to move away from the wall is distinctly minimized.

The entire bracket is a unitary sheet metal stamping, formed very economically from one side, without any hooked-over regions. At the hook region of the stamping is a strengthening bead which serves the additional purpose of engaging the downcomer (as above stated) for increased strength and proper torque relationships. The entire bracket is flanged to increase strength and to provide lateral stability relative to the downcomer. The flanges are provided with integral strengthening beads.

DETAILED DESCRIPTION OF THE PREFERRED EMBODIMENT

As stated above, the present brackets, indicated generally at 10, are particularly adapted to be associated with vertical channel-shaped elements called downcomers and shown at 11. Each such downcomer has a web 12 and two side flanges 13, 14. The edges of flanges 13, 14 are engaged with a vertical wall or bulkhead 16 (FIGS. 3 and 4), and screws 17 are provided at the upper and lower ends of each downcomer to secure it to the wall (only the upper screw being shown).

Figures 3, 4, 5:
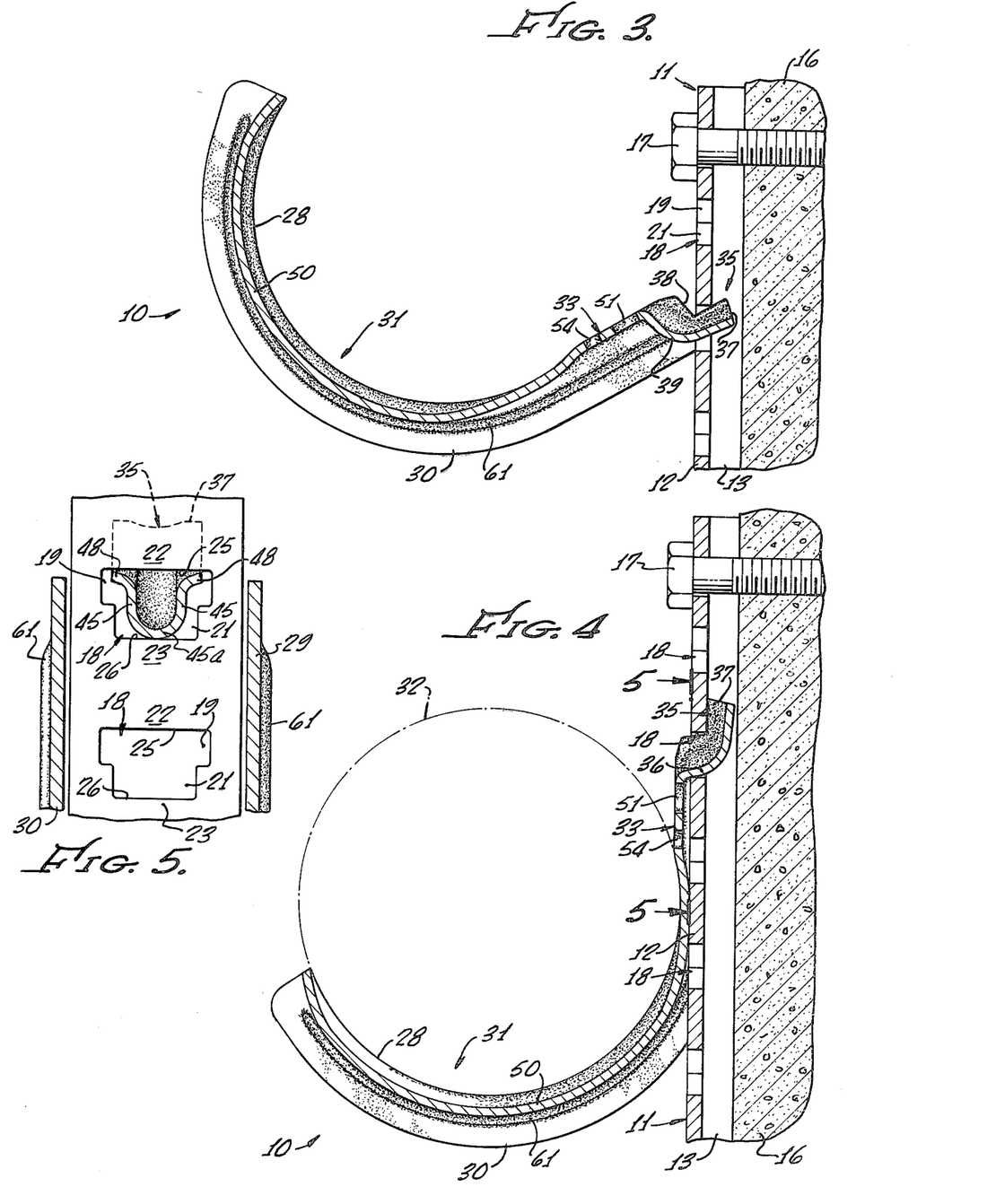
FIG. 3 is a vertical sectional view showing, in general, the manner of mounting the bracket to the downcomer, the upper mounting bolt and the wall being illustrated in this view.
FIG. 4 corresponds to FIG. 3 but shows the fully mounted bracket, the supported electrical cable being shown in phantom lines.
FIG. 5 is a fragmentary vertical sectional view on line 5—5 of FIG. 4.

Formed in vertically-spaced relationship in web 12 are T-slots 18. As best shown in FIG. 5, each such T-slot has a cross-bar portion 19 and a relatively wide stem portion 21.

For convenience, hereafter, the web region adjacent the upper side of cross-bar portion 19 is called the "upper edge of the slot," and is numbered 22. Correspondingly, the web region below the slot stem 21 is called the "lower edge of the slot," and is numbered 23. It is, of course, recognized that a slot does not have an edge (the edge being actually on the web), but the above-stated language is nevertheless used.

Those horizontal surfaces which are formed on web 12 immediately above and below each T-slot 18 are numbered, respectively, 25 and 26 and are called the "walls" of the slots. Thus, surface 25 is the upper wall of the slot, whereas surface 26 is the lower wall thereof.

Proceeding next to a detailed description of the bracket 10, this is preferably an integral stamping of relatively heavy-gauge sheet metal and is generally J-shaped. The body of the bracket 10 is generally channel-shaped (in section) throughout, having a web 28 and side flanges 29, 30. The web is sufficiently wide that flanges 29 and 30 fit outwardly adjacent downcomer flanges 14, 13 when the bracket is in mounted condition. The flanges are not sufficiently wide that wall 16 is engaged thereby at any time.

Web 28 is generally semicylindrical at the hooked portion 31 of bracket 10, so as to seat snugly the electrical cable indicated at 32 in FIG. 4. The cable 32 often has a soft outer insulation, for example of rubber or lead, and thus (to prevent damage) requires a large-area flatwise contact as by the web 28.

The stem portion 33 of the bracket is generally straight (substantially planar), and extends upwardly for a considerable distance above the base of hook portion 31. The amount of this vertical extension of stem 33 is preferably sufficient that at least substantially the entire diameter of cable 32 will be beneath the T-slot 18 to which the bracket is mounted, reference being made to FIG. 4.

There will next be described the connector element 35 which strongly and easily secures bracket 10 to downcomer 11 at one of the T-slots 18. Stated generally, element 35 comprises a first means 36 adapted to seat on and be supported by the lower wall 26 of the slot. It further comprises a second means 37 adapted to be inserted through the slot and to engage the inner surface of upper slot edge 22. There is also provided a third means 38 which, when the bracket is in mounted position, is sufficiently close to upper slot wall 25 that the bracket (and its associated cable) may not be vibrated or jarred out of position. A fourth means is provided and constitutes a cam surface 39 to elevate automatically, in response to downward movement of the bracket, the second means 37 into its illustrated seated position (FIGS. 6 and 9) closely adjacent the rear of edge 22.

The connector element 35 is generally elbow-shaped, being hollow on the forward side thereof so as to be readily formed integrally with the sheet metal web 28 and flanges 29, 30. All of the indicated means 36–39, inclusive, are provided on this elbow-shaped connector element which is constructed as next described.

The lower portion of the elbow-shaped connector is the first means 36, being a rearward protuberance formed in web 28 by creating (stamping) a deep recess 43 (FIG. 2) in the forward side of such web. The upper portion of the elbow-shaped connector is the second means 37. It is a tab which extends upwardly from protuberance 36. The tab is disposed above, and spaced inwardly from, the upper edge 46 of web 28. Such tab is likewise hollow on its forward side, being recessed at 47 (FIG. 2) to form a continuation of the protuberance-forming recess 43.

Figures 1, 2, 6:
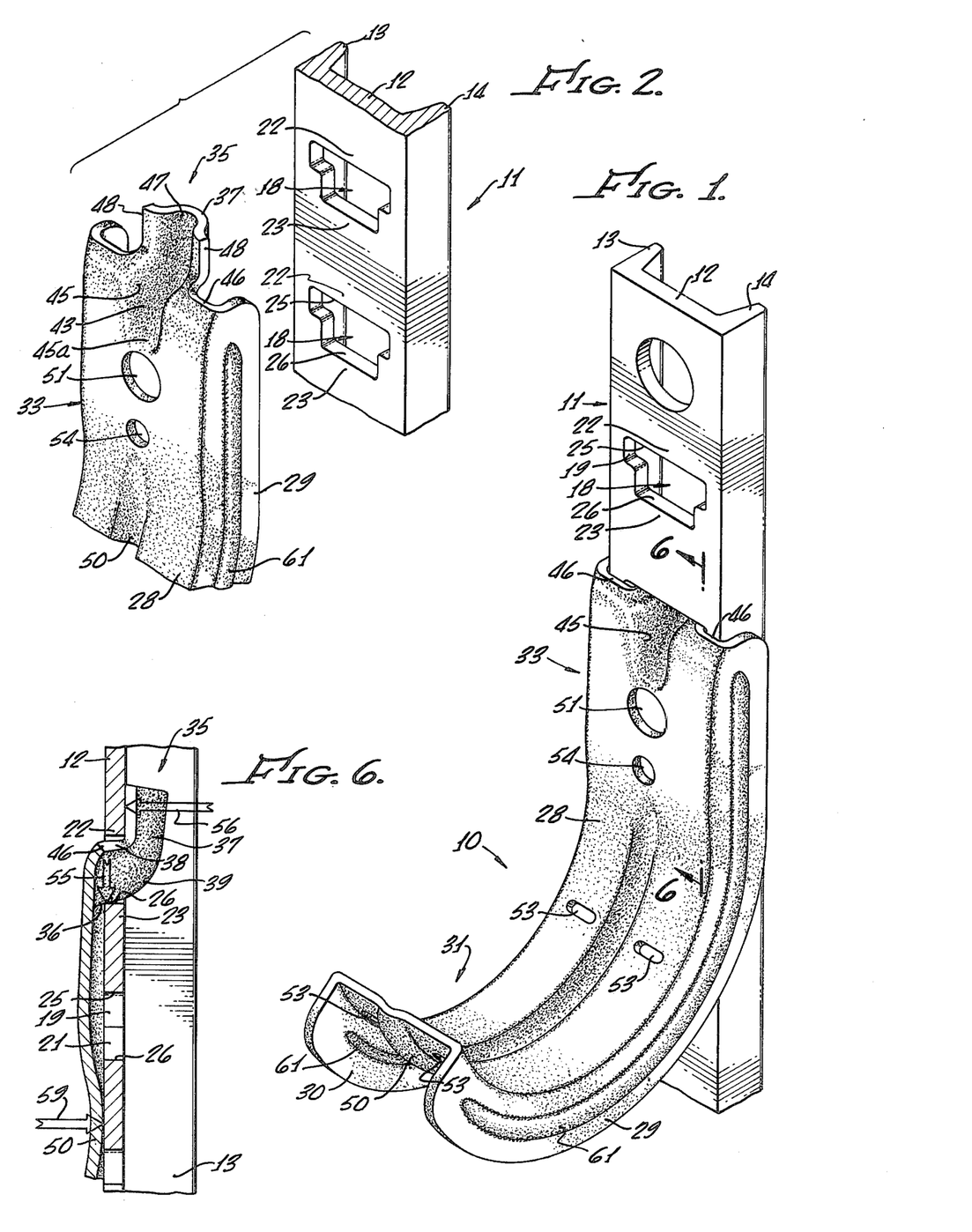
FIG. 1 is an isometric view showing one of the present brackets as mounted on a conventional downcomer, the upper bolt which connects the downcomer to the wall being unshown.
FIG. 2 corresponds to a portion of FIG. 1, but shows the connector region of the bracket as spaced outwardly from the downcomer for illustrative purposes.
FIG. 6 is an enlarged fragmentary view of the right region of FIG. 4, and incorporating arrows showing the various forces.

The upper web edge 46 is bent rearwardly to form a narrow flange adapted to be located closely adjacent the face of the downcomer (FIG. 1). This flange is continuous with side flanges 48 provided on the body of tab 37, reference being made to FIGS. 2, 5 and 7. The side flanges 48 cooperate with the rounded body of the tab to provide great strength. Furthermore, flanges 48 seat closely on the inner face of the downcomer.

To provide good seating on slot wall 26, without interfering with the cam action described below, the underside of protuberance 36 inclines upwardly (from the main vertical body of the adjacent portion of bracket web 28) at a substantial angle, reference being made to FIG. 9.

The protuberance 36, and the recess 43 which is created to form the protuberance, have three walls all integral with web 28. Two of such walls are opposed vertical side walls, being numbered 45 (FIGS. 1, 2 and 5). The third wall is a rounded bottom wall 45a (see FIGS. 1, 5 and 7) on which the cam surface 39 is formed. Side walls 45 provide very strong support for the bottom wall 45a.

The above-indicated third means 38, which is located sufficiently close to slot wall 25 to prevent vibration of the connector element out of position, comprises the upper edges of the protuberance 36. Referring particularly to FIG. 9, it will be seen that the vertical distance between each edge 38, and that portion of cam surface 39 which seats on slot wall 26, is only slightly less than the vertical distance between slot walls 25 and 26. Therefore, when the bracket is mounted to the downcomer there is no substantial possibility of demounting caused by vibratory forces.

The fourth means (cam means) 39 comprises the rounded underside of protuberance 36, substantially rearwardly of the vertical web region. This rounded underside of the protuberance cooperates with the lower wall 26 of the T-slot to provide a lifting, camming action relative to the tab 37 as described below. Particularly because of such camming action, the vertical dimension of tab 37 may be be very substantial yet the end of the tab does not engage wall 16 after insertion through the T-slot. A simple, effective mounting action occurs even when the downcomer flanges are narrow so as to afford little clearance between the downcomer web and wall 16.

Proceeding next to a further description of the portions of the bracket located below the connector element, there is provided in the web 28, at hook portion 31, a central bead 50 which projects downwardly and greatly increases the strength of such hook portion—cooperating with side flanges 29, 30 for this purpose. At the region where hook portion 31 meets the stem 33 of the bracket, bead 50 engages the outer surface of the downcomer web 12, as shown in FIGS. 4 and 6. This provides a region of high compression as described below. Preferably, the bead 50 ends somewhat above the base of the hook.

The rearward extension of tab 37 is no greater than the rearward extension of flanges 29, 30 of the bracket. Therefore, when desired, the bracket may be mounted against the wall 16 in the absence of any downcomer. To secure the bracket in this position, a bolt is inserted through an opening 51 located adjacent and beneath the protuberance 36.

A plurality of openings are provided in the hook region of the bracket, as indicated at 53 (FIG. 1), to permit insertion of tie elements (not shown) which can be used to secure the cable firmly to the bracket. An additional opening, 54, is provided below the opening 51 in order to form an additional aperture through which tie elements may be inserted when desired.

FURTHER DESCRIPTION OF OPERATIONS AND STRUCTURE

Figure 8:
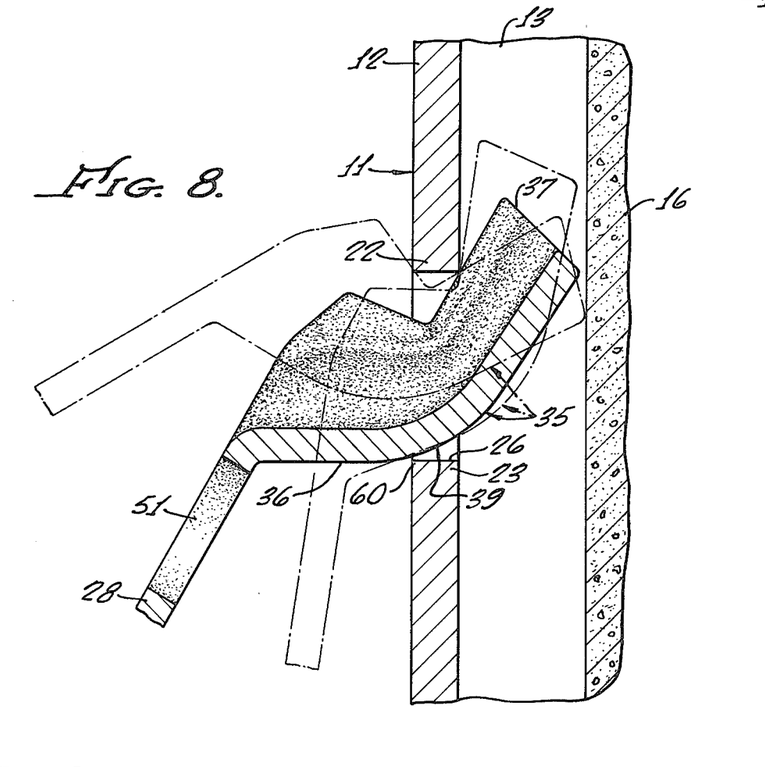
FIG. 8 is an enlarged view corresponding somewhat to the right central region of FIG. 3, and showing the camming action which occurs during gravity-mounting of the bracket.

To mount the bracket 10 to downcomer 11 at any desired T-slot 18, the operator merely holds the bracket at an angle and inserts tab 37 through such T-slot as shown in FIGS. 3 and 8. The degree of insertion is limited by edges 46. The operator then lets go of (drops) the bracket, following which gravity and cam action complete the mounting operation.

As soon as the operator drops the bracket, the cam means 39 falls down on lower slot wall 26 (FIG. 8). Such lower wall then acts as a fulcrum, so that the outer portion of the bracket follows a downward, counterclockwise pivotal path of movement as illustrated. This is accompanied by upward counterclockwise movement of tab 37 until the connector element 35 is in the fully mounted position of FIGS. 9, 6 and 1. The shapes of cam 39 and tab 37 are such that the wall 16 is not engaged.

The cam-mounting action is thus not only effected extremely easily, but in such manner that there is permitted a very deep (front to rear) dimension of the tab 37 in comparison to the depth of the channel within downcomer 11. Particular reference is made to the much enlarged FIG. 9, which shows that when the tab is in mounted condition there is only a very small clearance between it and the wall, yet the front-to-rear tab dimension is large as stated. Because of this large front-to-rear dimension of the tab, it has great resistance against bending and other forces. Furthermore, as noted above, the tab can be relatively long (for more bearing area) and still clear the wall 16.

The operator then mounts the cable 32 (FIG. 4) in hook portion 31 of the bracket, and inserts any desired tie elements (not shown) through openings 53 and (if desired) 54 (FIG. 1). The tie elements are then secured over cable 32.

There is no danger that vibratory or other forces will cause the bracket to be demounted from the downcomer. The vibratory forces are generally vertical, being normally created by trucks passing on the street above the electrical vault or passage. Such forces cannot cause the bracket to move upwardly, for reasons stated above. No downward movement can occur, since the protuberance 36 seats on lower slot wall 26; no forward movement can occur in that the tab 37 is closely behind slot edge 22; and no rearward movement can occur in that the flanged upper edge 46 of the channel web is closely adjacent the forward face of the downcomer (FIG. 1). Substantial sideways movement is prevented by element 35 and by flanges 29, 30, all cooperating with the downcomer. It is emphasized that the upwardly-inclined cam surface 39 (FIG. 9) cannot cause the connector element 35 to slide off wall 26, provided that the cam surface has a correct angle as set forth below.

If the operator desires to change the elevation of the cable and associated bracket, it is merely necessary to cause pivoting back to the FIG. 3 position, then change the tab 37 to a different T-slot, and then drop the cable and hook so that the cam action causes mounting as above described. The elevation change can be effected whether or not the cable is in position in the hook 31.

The strength of the present bracket has been found to be surprisingly great, despite the fact that it may be formed economically of sheet metal. There are numerous reasons for this surprising strength, a major reason being the protuberance 36 which has a very substantial vertical dimension and which is strongly supported on three sides by web 28 of the bracket, being integral therewith. Such protuberance (as it seats on lower slot wall 26) creates greater resistance to downward shear forces. The downward shear is shown at the arrow 55, FIG. 6.

Figures 7, 9:
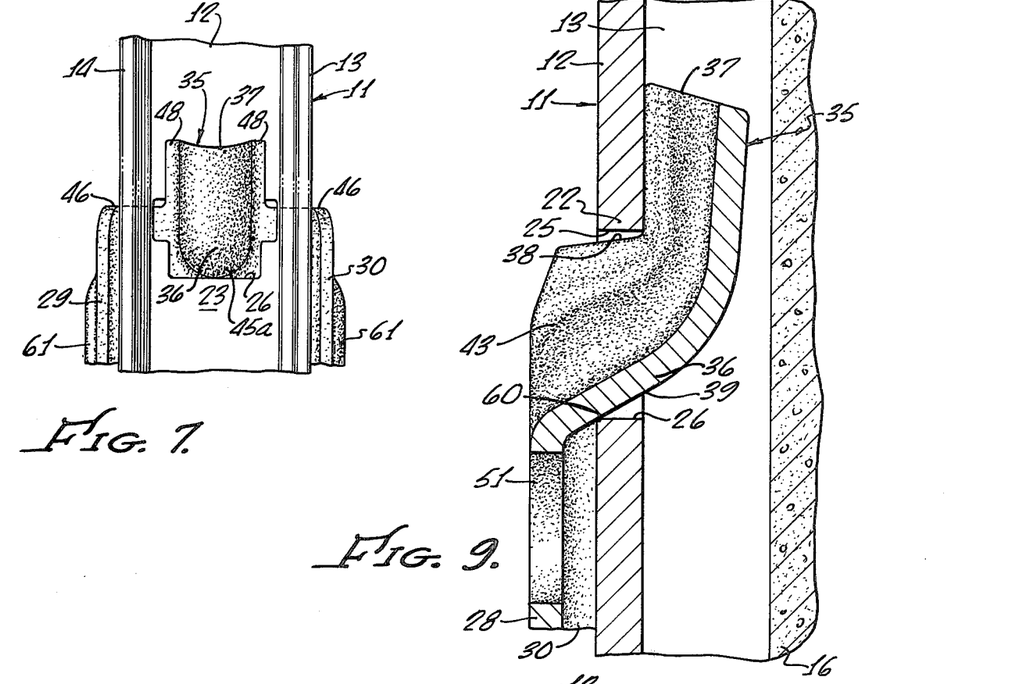
FIG. 7 is a vertical view showing the connector element as viewed from inside the downcomer.
FIG. 9 is a greatly enlarged fragmentary view of the upper regions of FIGS. 4 and 6.

In the event that the downward forces ever become so high as to tend to cause the protuberance 36 to bend, any such bending would tend to be counterclockwise as viewed in FIG. 9, and would be resisted by the engagement of tab 37 with the rear face of slot edge 22.

In summary, the connector element 35 bears forwardly against the downcomer web as indicated by the arrow 56 in FIG. 6, and also bears downwardly against slot wall 26 as indicated by arrow 55. In addition, when there are vibrational forces, the connector element 35 bears upwardly against the upper slot wall 25 as described.

Referring again to FIG. 6, it is pointed out that the weight of the cable causes forcible pivoting of the bracket about slot wall 26, so that a horizontal compressive force is exerted on the downcomer web as indicated by arrow 59. This force is opposed by a force at the tab 37 as indicated at arrow 56. There is a tendency for the stem portion of the J to bend, but it is very resistant to bending, particularly because of the presence of flanges 29, 30.

Because of the fact that the length of stem portion 33 is relatively great, as stated, the forces exerted on the connector element 35 are largely shear, as is desired in that the protuberance 36 is extremely shear resistant. The large downward forces, caused by the direct action of the weight of the cable and by the fact that arrow 59 is located a long distance below the T-slot through which the connector element 35 is inserted, are effectively resisted by the protuberance.

To achieve the great shear resistance of the protuberance 36, and the effective cooperation thereof with tab 37 as described above, the angle (relative to the horizontal) of the upwardly-inclined lower surface of the protuberance, where it seats on the lower slot wall 26, is caused to be below 45 degrees. Preferably, such angle is about 30 degrees, or even less, as best shown in FIG. 9. It is to be noted that the lower slot wall 26 is horizontal as illustrated.

Testing has shown that where the angle of the lower surface of the protuberance (relative to the horizontal) is above 45 degrees, the application of high loads causes the protuberance to try to slide off slot wall 26. The tab 37 is then (at high loading) ineffective to prevent such sliding, so the tab breaks despite its strong construction.

When, on the other hand, the angle of the lower protuberance surface relative to the horizontal (where the protuberance seats on wall 26) is about 30 degrees, no such sliding results. Instead, the corner 60 (FIG. 9) where wall 26 meets the vertical forward face of downcomer 11 bites slightly into the protuberance. There was then no breakage at tab 37, failure instead occurring at the hook as above stated. More specifically, the side flanges 29, 30 buckled.

There therefore occurred the surprising result that two large side flanges 29, 30 buckled at a load which created no deformation (except the stated small biting of corner 60 into the protuberance) of the relatively small protuberance-tab combination. Furthermore, the indicated great strength was achieved in combination with the described cam action which greatly facilitates mounting.

The generated forces are such that the downcomers, despite the fact that they are held by only two bolts 17 (one at each end thereof) to the wall or bulkhead 16, do not tend to bend or pull nearly as far away from the wall as do downcomers which support conventional brackets long used in the art. This, again, is because the forces are primarily downward. The inward force present at arrow 59 is much larger than the outward (bending) force shown at 56, since the force at 56 is greatly reduced by the long "lever arm" between 56 and 59.

When formed of twelve-gauge sheet metal (mild steel), brackets having diameters of three inches and five inches (for three and five inch cables) have been tested to failure at weights between 1120 pounds and 2406 pounds. Furthermore, it is emphasized that this failure did not occur at the connector element 35, but instead was a slow downward movement of the hook portion 31. The failure did not result in any danger to anyone, which is to be distinguished from conventional prior-art brackets wherein failure sometimes causes a sudden flying of metal elements away from the downcomer.

Despite the fact that the downward movement occurred in the bracket portion 31, it is emphasized that the bead 50 in such portion greatly increases the strength thereof. As above stated, this bead not only strengthens the hook portion but provides a point of bearing (at arrow 59, FIG. 6) of the bracket against the downcomer.

Especially since there are no undercuts, the present sheet metal bracket may be formed very economically. As stated above, it is emphasized that the recesses 43 and 47, which are employed in the formation of connector element 35, are formed from the same side of the bracket as is the deep recess which forms the hook portion 31. There is no reverse-bending, undercutting, etc.

Although the present bracket may be used with existing or new T-slotted downcomers, it is not limited to such downcomers. Instead, it is possible to employ the present bracket with downcomers which have, for example, rectangular holes as distinguished from T-slots. It is emphasized, however, that it is a tremendous advantage that the present bracket will work with the large numbers of T-slotted downcomers presently existing in the field.

The above-indicated test results occurred relative to testing of brackets constructed as shown in the drawings, except that there were no strengthening beads or ribs 61 on side flanges 29, 30. It is preferred that such beads 61, extending longitudinally of the flanges, be provided as shown—this being now considered the best mode. By providing beads 61 it is contemplated that even higher loads than the loads stated above will be carried by the brackets.

There has thus been described a bracket and downcomer wherein the bracket is associated with the downcomer in a manner completely different from anything known in the art. There has been achieved surprising strength, surprising ease of insertion and adjustment, surprising inexpensiveness, great resistance to vibratory and other forces, reduced tendency to bend the downcomer, and other advantages.

Although the brackets have been described as being formed of sheet metal, which is the best mode, it is possible in some cases to make them out of a strong synthetic resin, by injection or other molding.

The foregoing detailed description is to be clearly understood as given by way of illustration and example only, the spirit and scope of this invention being limited solely by the appended claims.

We claim:

1. A one piece-support bracket for electrical conductors, cables and other loads, said bracket being adapted to be removably mounted on a T-slotted channel-shaped downcomer in an electrical vault or passage, said bracket comprising:

(a) an enlongated support portion, and
(b) a connector element provided at one end of said support portion,
    said connector element comprising a protuberance formed in said support portion by recessing one side thereof,
    said protuberance having a bottom wall adapted to seat on the lower wall of a T-slot in said downcomer, said proturberance also having side walls which strengthen greatly said bottom wall thereby said protuberance may support large loads, said connector element further comprising a tab extending vertically from said protuberance and adapted to bear against a horizontal edge of said slot at the inner face thereof.

2. The invention as claimed in claim 1, in which said connector element further comprises a region adapted to be disposed sufficiently close to the upper wall of said T-slot that said connector element may not vibrate out of said T-slot.

3. The invention as claimed in claim 1, in which said tab is adapted to extend behind the upper horizontal wall of said T-slot, and in which said connector element further comprises a rounded cam region provided on the lower side of said bottom wall of said protuberance, said cam region being so shaped, and said support portion being sufficiently heavy, that gravitational downward pivoting of said support portion will cause said cam region to cooperate with said lower slot wall in such manner that said tab is shifted upwardly to a position adjacent the interior surface of the upper slot edge.

4. The invention as claimed in claim 3, in which said protuberance and said tab are shaped generally as a hollow elbow.

5. The invention as claimed in claim 4, in which the hollow side of said elbow faces outwardly when said bracket is mounted on said downcomer.

6. The invention as claimed in claim 4, in which said support portion is flanged, the flanges being adapted to extend on opposite sides of said downcomer for stabilization of the bracket.

7. The invention as claimed in claim 1, in which said one end of said support portion is adapted to be closely adjacent the face of said downcomer when said bracket is in mounted position.

8. The invention as claimed in claim 1, in which said bracket has only one portion which is adapted to be inserted through a T-slot, so that only one T-slot is penetrated.

9. A support for large diameter cables, which comprises:
(a) a T-slotted channel-shaped downcomer secured in vertical relationship to a wall or bulkhead, with the flanges of the channel adjacent the wall,
(b) a J-shaped sheet-metal support bracket mounted to said downcomer at only one of the T-slots therein, a region of said bracket near the base of the hook portion of the J bearing against the face of said downcomer far below the upper end of said bracket, and
(c) a connector element provided integrally on said bracket at the upper end of the J, as a one-piece sheet metal element with said bracket and without any welds or other connections,
said connector element being a hollow elbow, the hollow side of which faces forwardly,
said elbow being at its lower portion a deep-drawn protuberance in the web of said bracket, the underside of said protuberance seating in a lower wall of said slot,
said protuberance having opposed side walls disposed in generally vertical relationship, said side walls providing great support for the lower side of said protuberance which seats on said lower slot wall,
the upper side of said elbow being adjacent the upper wall of said slot to resist vibrational forces tending to dislodge said bracket, said elbow being at its upper portion a tab which extends through said T-slot to a position behind the upper edge of said slot.

10. The invention as claimed in claim 9, in which said protuberance is shaped on its underside to provide a cam action automatically shifting said tab into close proximity to the inner side of said upper slot edge.

11. The invention as claimed in claim 9, in which the angle of said underside of said protuberance, relative to the horizontal, is about 30 degrees.

12. A very strong support bracket shaped for easy mounting at only a single opening in a vertical support element, said bracket comprising:
(a) a body portion adapted to engage an object to be supported, and
(b) a mounting element provided on said body portion for insertion through an opening in a vertically-oriented support element,
said mounting element comprising a strong protuberance provided on said body portion,
said protuberance having an inclined lower surface region adapted to engage and be supported by the lower wall of said opening, the degree of inclination being sufficient that downward pivoting of said bracket causes automatic elevation of said protuberance to mounted condition at which said protuberance and the entire bracket are supported against downward shear loads by said lower wall,
said protuberance being hollow and open at the front side of the bracket, having upwardly-extending side walls the lower portions of which are integral with a bottom wall which rests on said lower wall of said opening,
said mounting element further comprising a tab provided at the upper side of said protuberance and extending behind the upper edge of said opening when said protuberance is thus mounted,
said tab preventing said protuberance from sliding or pivoting off said lower wall.

13. The invention as claimed in claim 12, in which said bracket is formed entirely of a single piece of sheet metal.

14. Support apparatus for electrical conductors, comprising:
(a) a T-slotted channel-shaped downcomer,
the T-slots in said downcomer being vertically spaced along the web thereof, the stem portion of each T-slot being relatively wide and extending downwardly from the crossbar portion of such T-slot,
(b) a sheet-metal support bracket removably mounted at any of said T-slots without support dependent upon any other of said T-slots,
said support bracket comprising an elongated support portion adapted to support electrical conductors,
said support bracket further comprising an integral protuberance formed in said support portion by recessing one side thereof,
said protuberance having a bottom wall portion seated on the lower wall of the stem portion of any T-slot in said downcomer,
said protuberance also having a tab extending upwardly therefrom and adapted to bear outwardly against the inner face of said web above the crossbar portion of any T-slot, said protuberance tab being integral with each other and shaped as a deep-drawn hollow elbow, the hollow side of the elbow facing outwardly when said support bracket is mounted on said downcomer, said protuberance having side walls integral with said bottom wall portion and strengthening the same, said hollow elbow being much less wide than said support portion of said support bracket, and (c) means provided on said support portion of said support bracket to bear against the outer surfaces of the flanges of said downcomer, thus preventing substantial lateral shifting of said support bracket.

15. A support bracket adapted to be removably mounted at an opening without support dependent upon any other opening, said support bracket comprising:

(a) a sheet-metal support portion, and (b) protuberance formed integrally in said support portion by recessing one side thereof, said protuberance being adapted to seat on the lower wall of an opening, said protuberance having a tab extending upwardly therefrom, there being flanges provided integrally on both sides of said tab to increase the strength thereof, said protuberance and tab being integral with each other and shaped as a deep-drawn hollow elbow, the hollow side of the elbow facing outwardly when said support bracket is mounted at said opening, said hollow elbow having side walls integral with a bottom wall which seats on said lower wall of said opening, said side walls imparting strength to said bottom wall.

16. A one-piece support bracket for electrical conductors, cables and other loads, said bracket being adapted to be removably mounted on a T-slotted channel-shaped downcomer in an electrical vault or passage, said bracket comprising:

(a) an elongated support portion, and (b) a connector element provided at one end of said support portion, said connector element comprising a protuberance formed in said support portion by recessing one side thereof, said protuberance being adapted to seat on the lower wall of a T-slot in said downcomer, said connector element further comprising a tab extending vertically from said protuberance and adapted to bear against a horizontal edge of said slot at the inner face thereof, said tab being adapted to extend behind the upper horizontal wall of said T-slot, said connector element further comprising a rounded cam region provided on the lower side of said protuberance, said cam region being so shaped and said support portion being sufficiently heavy, that gravitational downward pivoting of said support portion will cause said cam region to cooperate with said lower slot wall in such manner that said tab is shifted upwardly to a position adjacent the interior surface of the upper slot edge, said protuberance and said tab being shaped generally as a hollow elbow, the hollow side of said elbow facing outwardly when said bracket is mounted on said downcomer, said support portion being much wider than said elbow, and the end of said support portion at said elbow being flanged, the flanges at said end continuing integrally along both sides of said tab to increase greatly the strength thereof.

17. A one-piece support bracket for electrical conductors, cables and other loads, said bracket being adapted to be removably mounted on a T-slotted channel-shaped downcomer in an electrical vault or passage, said bracket comprising:

(a) an elongted J-shaped support portion, said J-shaped support portion being shaped to receive snugly an electrical cable, said support portion being flanged, the flanges being adapted to extend on opposite sides of said downcomer, and (b) a connector element provided at one end of said support portion, said connector element comprising a protuberance formed in said support portion by recessing one side thereof, said protuberance being adapted to seat on the lower wall of a T-slot in said downcomer, said connector element further comprising a tab extending vertically from said protuberance and adapted to bear against a horizontal edge of said slot at the inner face thereof, said tab being adapted to extend behind the upper horizontal wall of said T-slot, said J-shaped support portion being adapted to bear against said downcomer at a point spaced below said connector element, said connector element further comprising a rounded cam region provided on the lower side of said protuberance, said cam region being so shaped, and said support portion being sufficiently heavy, that gravitational downward pivoting of said support portion will cause said cam region to cooperate with said lower slot wall in such manner that said tab is shifted upwardly to a position adjacent the interior surface of the upper slot edge, said protuberance and said tab being shaped generally as a hollow elbow, said support portion being much wider than said elbow, and the end of said support portion at said elbow being flanged, the flanges at said end continuing integrally along both sides of said tab to increase greatly the strength thereof.

18. The invention as claimed in claim 17, in which a bead is formed downwardly in said J-shaped support portion to strengthen the same, one end region of said bead being adapted to bear against the face of said downcomer at a point spaced far below said connector element.

19. A support for large diameter cables, which comprises:

(a) a T-slotted channel-shaped downcomer secured in vertical relationship to a wall or bulkhead, with the flanges of the channel adjacent the wall, (b) a J-shaped sheet-metal support bracket mounted to said downcomer at only one of the T-slots therein, a region of said bracket near the base of the hook portion of the J bearing against the face of said downcomer far below the upper end of said bracket, said bracket having downwardly and rearwardly extending side flanges, portions of which fit on opposite sides of said downcomer, and (c) a connector element provided integrally on said bracket at the upper end of the J, as a one-piece sheet metal element with said bracket an without any welds or other connections, said connector element being a hollow elbow, the hollow side of which faces forwardly, said elbow being at its lower portion a deep-drawn protuberance in the web of said bracket, the underside of said protuberance seating in a lower wall of said slot, the upper side of said elbow being adjacent the upper wall of said slot to resist vibrational forces tending to dislodge said bracket, said elbow being at its upper portion a tab which extends through said T-slot to a position behind the upper edge of said slot.

20. A one-piece support bracket for electrical conductors, cables and other loads, said bracket being adapted to be removably mounted on a T-slotted channel-shaped downcomer in an electrical vault or passage, said bracket comprising:

(a) an elongated support portion, said support portion being flanged, the flanges being adapted to extend on opposite sides of said downcomer, said flanges on said support portion having strengthening beads provided integrally thereon longitudinally thereof, said flanged support portion being generally hook-shaped to receive snugly an electrical cable, and (b) a connector element provided at one end of said support portion, said connector element comprising a protuberance formed in said support portion by recessing one side thereof, said protuberance being adapted to seat on the lower wall of a T-slot in said downcomer, said connector element further comprising a tab extending vertically from said protuberance and adapted to bear against a horizontal edge of said slot at the inner face thereof, said tab being adapted to extend behind the upper horizontal wall of said T-slot, said connector element further comprising a rounded cam region provided on the lower side of said protuberance, said cam region being so shaped, and said support portion being sufficiently heavy, that gravitational downward pivoting of said support portion will cause said cam region to cooperate with said lower slot wall in such manner that said tab is shifted upwardly to a position adjacent the interior surface of the upper slot edge, said protuberance and said tab being shaped generally as a hollow elbow, said support portion being much wider than said elbow, and the end of said support portion at said elbow being flanged, the flanges at said end continuing integrally along both sides of said tab to increase greatly the strength thereof.

* * * * *